United States Patent

[11] 3,627,598

[72] Inventors Bruce A. McDonald
Menlo Park;
Michael B. Dragmire, San Jose, both of Calif.

[21] Appl. No. 8,903
[22] Filed Feb. 5, 1970
[45] Patented Dec. 14, 1971
[73] Assignee Fairchild Camera and Instrument Corporation
Syosset, N.Y.

[54] NITRIDE PASSIVATION OF MESA TRANSISTORS BY PHOSPHOVAPOX LIFTING
7 Claims, 10 Drawing Figs.

[52] U.S. Cl. .......... 156/13, 156/11, 156/17, 317/234.5
[51] Int. Cl. .......... H01l 7/00, H01l 7/50
[50] Field of Search .......... 156/17, 11, 13

[56] References Cited
UNITED STATES PATENTS
3,526,555 9/1970 Alexander .......... 156/17

*Primary Examiner*—Jacob H. Steinberg
*Attorneys*—Roger S. Borovoy and Alan H. MacPherson

ABSTRACT: A method of forming a barrier layer impermeable to mobile ions over both the curved and upper plane portions of the principal surface of a mesa-structured semiconductor device. The barrier layer is caused to crack when placed over a special liftant but not when placed over the remainder of the device surface. An etching solution via the cracks then removes the liftant and desired portions of the barrier layer so that electrical contact can be made subsequently to active regions of the device.

INVENTORS
BRUCE A. MC DONALD
MICHAEL B. DRAGMIRE
BY [signature]
Alan H. MacPherson ATTORNEY INVENTORS
BRUCE A. McDONALD
MICHAEL B. DRAGMIRE
BY [signature]
ATTORNEY

NITRIDE PASSIVATION OF MESA TRANSISTORS BY PHOSPHOVAPOX LIFTING

BACKGROUND OF THE INVENTION

1. Field of the Invention

This invention relates to a method of passivating the principal surface of a mesa-type semiconductor device. In particular, this invention relates to a method of passivating the curved as well as the plane portion of the principal surface and protecting the electrical characteristics thereof.

2. Description of the Prior Art

Previously, it has been difficult to form a passivating, protective layer over both the curved and plane portions of the principal surface of a mesa semiconductor structure in order to protect the electrical characteristics of the device and prevent unwanted contamination, particularly mobile ions, from reaching the edge of a PN-junction appearing at or along the curved portion of the surface.

Because of this shortcoming, many semiconductor devices are fabricated with a planar structure wherein the surface edge of the junctions appears along the upper plane surface. Planar PN-junctions are characterized by a curved as well as flat portion. Techniques widely used in the semiconductor field have been developed for protecting the surface edge of planar-type junctions.

For some applications, however, it is desirable to operate the device at higher breakdown voltages levels than that usually provided by devices having planar-type PN-junctions due to the junction curvature of planar devices. A mesa-type structure is a practical alternative, because a PN-junction can be formed therein, without significant junction curvature, so that a substantially higher breakdown voltage characteristic is provided. Unfortunately, it is difficult to passivate the curved portion of the mesa surface, and the surface edge of PN-junctions in mesa devices are often adversely affected by surface contamination.

Heretofore, it has been difficult to apply the widely used semiconductor passivation techniques to both the plane and curved portions of mesa-type semiconductor devices. In general, semiconductor devices are manufactured by forming a layer of protective oxide over the principal surface of the semiconductor substrate, and then removing selected portions of the oxide to create openings along the surface. Dopant atoms of a desired conductivity type are next diffused through the openings into the substrate, the dopants forming the active regions separated by PN-junctions which characterize a semiconductor device.

For selective removal of the oxide layer, photoresist and etching techniques are used. Photoresist is conveniently applied in a moist or liquid form and then dried, after which it is exposed through a mask and selectively removed by a developing step. When applied to a mesa structure, because there is a corner where the curved and upper flat surfaces come together, upon drying, the photoresist tends to pull together, or shrink. Cracks and openings thus appear at and in the vicinity of the corner. Subsequently, application of an etchant to the device causes removal not only of a desired portion of the oxide, but also of the protective oxide underlying any of the cracks or openings near the corner of the mesa, leaving little, if any, oxide to protect the curved-surface edge of a PN-junction.

Attempts have been made, usually after the active regions have been diffused from the upper plane surface, to apply some kind of protective solution to the curved surface portion. Such attempts are generally unsatisfactory because the passivating solution itself often contains unwanted contaminants, such as sodium or other mobile ions, which affect the surface characteristics of the curved portion and often cause an undesirable increase in leakage current.

Another approach for passivating the exposed surface of a semiconductor device comprises forming a layer of nitride, suitably silicon nitride, thereover. Characterized by a dense atomic structure, nitride makes an effective barrier to mobile ions, but when applied directly to the semiconductor surface, nitride causes an increased number of fast surface states. It is undesirable therefore in some applications for a nitride barrier layer to be located directly over the surface edge of an emitter-base junction, because when the junction is operated in the forward-bias direction, once the nitride layer has increased the number of fast surface states, greater recombination currents are produced. Moreover, with mesa-type devices, it is difficult to deposit the nitride over the principal surface and then remove selected portions of the nitride layer in order to provide openings that allow electrical contact to be made to the active regions of the device.

Therefore, a better approach is needed for protecting and applying a barrier layer to the principal surface of a mesa-type semiconductor device.

SUMMARY OF THE INVENTION

The method according to the invention eliminates the above-mentioned problems by enabling a passivating layer of barrier material to be formed upon both the curved and plane portions of the principal surface of a mesa device, while protecting the junction edge from contamination and from undesirable effects of the barrier layer.

Briefly, the method comprises forming a layer of protective, passivating dielectric material, such as thermal oxide, over the principal surface; forming a dielectric lifting material having a rapid etch rate over selected portions of the protective layer; forming a layer of barrier material having a slow etch rate, such as nitride, over exposed portions of the lifting material, the protective layer, and the principal surface, if any, in such a manner that a multiplicity of cracks are formed in that portion of the barrier layer located over the liftant but not in that portion located over the protective layer; and applying an etchant via the cracks to remove the lifting material including the barrier layer located thereon and protective layer located thereunder while leaving the barrier layer and protective layer on the remainder of the surface.

DESCRIPTION OF THE PREFERRED EMBODIMENTS

Figure 1A:
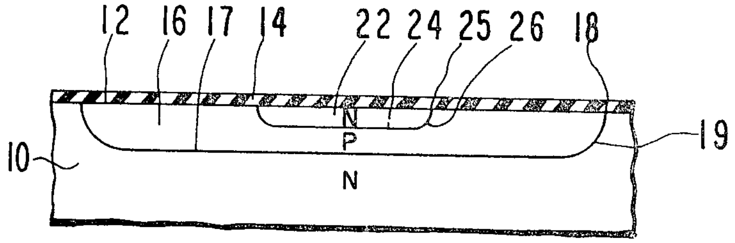
FIGS. 1A and 1B are simplified cross-sectional views of a semiconductor structure undergoing preliminary preparation prior to applying the method of the invention.

Referring to FIG. 1A, a semiconductor device is initially prepared prior to application of the method of the invention. It is appreciated that a mesa-structure semiconductor device can be prepared prior to application of the method of the invention by techniques other than that described hereinafter and shown in FIGS. 1A and 1B, without departing from the scope of the invention, and which will be apparent to one skilled in the art. The device initially comprises a substrate of semiconductor material 10, such as silicon, of one conductivity type, such as N-type, and has a principal surface 12. Located over principal surface 12 is a layer 14 of protective, passivating material, suitably an oxide. A first region 16 of opposite conductivity type, such as P-type, is located within the substrate and extends from the principal surface 12 to form a first PN-junction 17 therewith, junction 17 having an edge 18 at principal surface 12. PN-junction 17 is also characterized by an intermediate curved portion 19 located between the upper surface edge 18 and lower flat portion 17. For high breakdown voltage operation, the curved portion 19 is undesirable, because an electrical field applied to junction 17 tends to become more concentrated along curved portion 19 than along flat portion 17, and the breakdown voltage along curve 19 is consequently lower than along the flat portion 17.

A second active region 22 of one conductivity type, such as N-type is located within first region 16 and extends from the upper surface 12. Another PN-junction 24 is located between first and second regions 16 and 22, and extends to have an edge 25 at the upper surface 12. Junction 24 is also of the planar type, being characterized by a lower flat portion 24, an intermediate curved portion 26, and an upper surface edge 25.

Figure 1B:
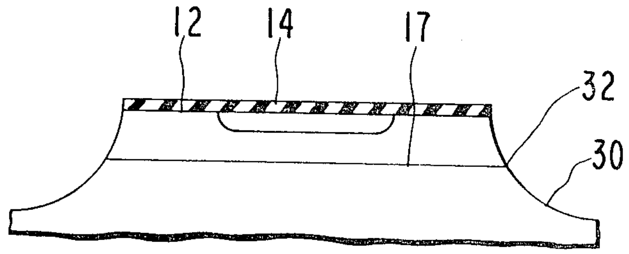

Typically, substrate 10 comprises the collector, first region 16 comprises the base, and second region 22 comprises the emitter of a double-diffused planar transistor. For high breakdown voltage operation, however, it is often desirable that the collector-base junction 17 be of a mesa type, rather than the planar type, as shown, so that the intermediate curved portion 19 is eliminated and the breakdown voltage characteristic thereby improved. For high breakdown voltage applications, therefore, a groove is formed, suitably using well-known etching techniques, around first region 16 to create a mesa structure and eliminate the intermediate curved portion 19 of collector-base junction 17, as shown in FIG. 1B.

In order to remove only selected portions of the semiconductor substrate, a masking material is formed, by deposition or growth, for example, on the top of the oxide layer 14. This material is capable of masking against the semiconductor etch, thereby protecting the substrate portions which are not to be removed. The masking material and underlying oxide 14 are then selectively removed in areas where it is desired to etch the substrate, followed by application of a suitable semiconductor etchant (such as a solution comprising five parts acetic acid, three parts nitric acid, and one part hydrofluoric acid by volume, or equivalent) to form groove 30.

The principal surface now comprises an upper plane portion 12 and a curved portion 30, with an edge 32 of collector-base junction 17 appearing along the curved portion 30 rather than at the upper portion 12. With the intermediate curved portion 19 eliminated, a more uniform electrical field appears along collector-base junction 17, improving the breakdown voltage characteristic. However, it is now necessary to protect and passivate the curved portion 30 as well as the upper portion 12 of the principal surface to prevent unwanted contamination, such as mobile ions, from reaching junction edge 32 and causing higher leakage current.

Figure 2A:
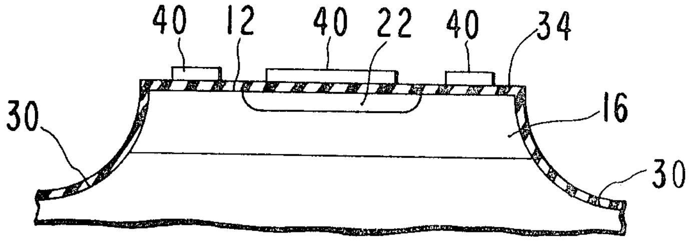
FIGS. 2A through 2C are simplified cross-sectional views of a semiconductor structure incorporating the method of the invention.

Because it is often desirable to provide a protective, passivating oxide layer over the principal surface that is of uniform thickness, the remainder of layer 14 can be removed, suitably by applying an etchant solution thereto (such as a solution of hydrofluoric acid of specific gravity 1.19, or equivalent), followed by the formation, by growth or deposition, of a layer of thermal oxide 34 approximately 0.5 micron thick over both the upper portion 12 and curved portion 30 of the principal surface, as shown in FIG. 2A.

A barrier layer having a dense atomic structure and providing protection from mobile ions is now needed over oxide layer 34. However, portions of the oxide and barrier layers must be selectively removed in order to provide openings so that subsequent electrical contact can be made to the active regions 16 and 22, while not subjecting the surface portions 12 and 30 to unwanted contamination. These functions are accomplished by a special lifting technique, as described hereinafter. First, a dielectric lifting material is formed, suitably by deposition of growth, over selected portion of the oxide layer 34. The liftant is then masked and a portion removed, leaving lifting portions 40 located above active regions 16 and 22 to which electrical contact is subsequently made.

Preferably, the dielectric lifting layer 40 comprises a material that etches rapidly in certain solutions but does not evaporate at elevated temperatures, such as around 850° C., does not react with the underlying oxide 34, and is not soluble in acids or solvents required to clean the surface prior to the subsequent step of depositing the barrier layer. Moreover, the lifting portions 40 must be capable of causing cracks to form in the barrier layer subsequently formed thereover so that an etching solution can reach the liftant. A particularly suitable lifting material comprises phosphovapox, phosphorus glass, or boron glass. For example, the lifting portions 40 may comprise about 50 percent phosphovapox and suitably are approximately 1.5 microns thick. Another suitable liftant, among others, comprises phosphosilicate glass 3,000 to 4,000 angstroms thick, usually formed by subjecting the oxide layer 34 to a phosphorus dopant such as $POCl_3$ at 1,070° C.

Prior to the step of depositing the barrier layer, it is necessary to clean the surface by immersing the device in a solution comprising relatively strong hydrochloric ($HCl$) and nitric ($HNO_3$) acids, which removes any stray particles or organic matter and thereby prevents pinholes from appearing in the barrier layer.

Figure 2B:
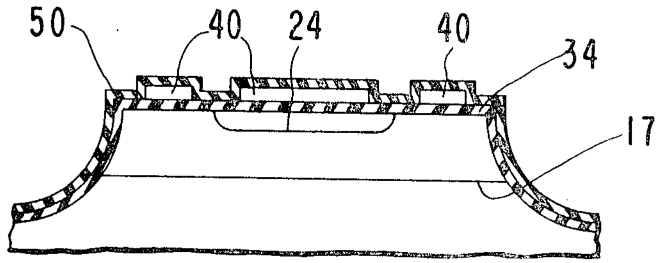

Referring to FIG. 2B, a layer of barrier material 50 is formed over the exposed thermal oxide 34 and lifting portions 40. Impermeable to mobile ions, the barrier layer 50 also acts as a barrier to oxide contaminants and hermetically seals the device. A nitride, particularly silicon nitride, makes an effective barrier material because of its dense atomic structure, and because it is compatible with liftants, such as phosphovapox, phosphorus glass, and boron glass. Moreover, the combination of thermal oxide ans silicon nitride functions to provide a stable oxide immediately adjacent to surface portions 12 and 30, with the barrier layer 50 separated from the surface by layer 34 so that the electrical characteristics of junctions 17 and 24 are not detrimentally affected.

Preferably, the silicon nitride layer 50 is approximately 1,500 angstroms thick and is deposited at a temperature of around 860° C. in such a manner that the nitride portions located above liftant portion 40 crack, whereas other portions of nitride layer 50 over the oxide layer 34 do not crack. The cracked portions of nitride layer 50 allow an etchant, such as a dilute acid (suitably comprising four parts water to one part hydrofluoric acid having a specific gravity of 1.19, or equivalent) to reach and dissolve the underlying liftant 40. Note that in dilute hydrofluoric acid, the barrier layer 50 has a relatively slow etch rate of approximately 1 angstrom per second, whereas the liftant 40 has a relatively rapid etch rate of approximately 500 angstroms per second.

While it is not entirely certain why the liftant 40 causes cracking in the barrier layer 50 during the deposition step, it is believed that the liftant 49 changes from a solid to a liquid phase at around or slightly above the deposition temperature of the barrier layer 50. Being in a liquid phase, the liftant 40 does not provide a stable support for the barrier layer 50, thereby causing the latter to crack, usually in many places.

As an alternative step for some applications, it may be preferred to cause the barrier layer portion located above liftant 40 to crack by applying heat at a temperature substantially higher than the deposition temperature of the nitride 50, such as around 1,200° C. Upon the application of heat, liftant 40 changes from a solid to a liquid phase and even may tend to bubble, so that a stable support is no longer provided for the barrier layer 50, causing a multiplicity of cracks in the latter.

Figure 2C:
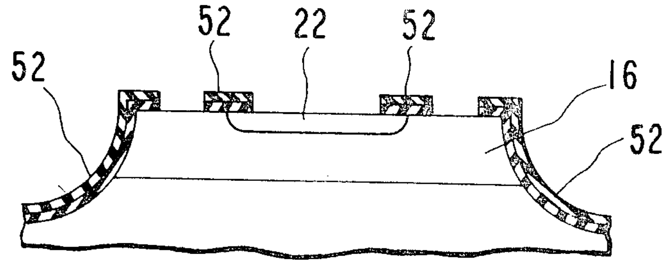

A dilute hydrofluoric acid is next applied to the surface and the device is ultrasonically agitated until the rapidly dissolving liftant 40 undercuts and lifts the slowly dissolving nitride portions located thereover, while leaving other nitride portions 52, as shown in FIG. 2C. That portion of the oxide layer 34 located directly under liftant 40 also dissolves, leaving a portion of active regions 16 and 22 exposed so that electrical contact can be made thereto during a subsequent step by the deposition of conductive material.

However, because mobile ions sometimes enter the oxide layer 34 laterally as well as vertically, for some applications it is desirable for the nitride barrier layer to overlap the oxide protective layer prior to the step of making electrical contact to the exposed active regions. The conductive material selected to make electrical contact to the active regions, typically aluminum, usually does not prevent lateral migration of mobile ions. Although multilayered metal contacts might be used as a barrier to lateral ion migration as well as for the electrical connections, such an approach is inconvenient and expensive compared to that of the invention wherein the nitride barrier layer extends to overlap and seal off the oxide layer 34, as described hereinafter.

Figure 3A:
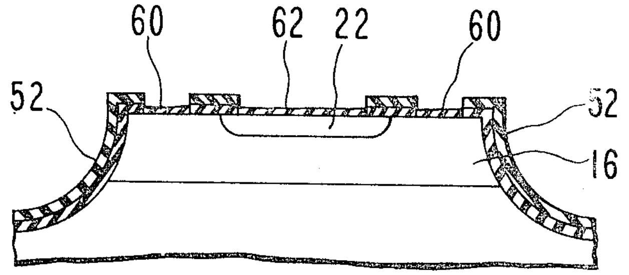
FIGS. 3A and 3D are simplified cross-sectional views of additional steps that provide another barrier layer which overlaps and seals the underlying oxide layer from mobile ions.

Referring to FIG. 3A, thin oxide portions 60 and 62 are formed by deposition or growth in the openings that expose portions of the active regions 16 and 22.

Figure 3B:
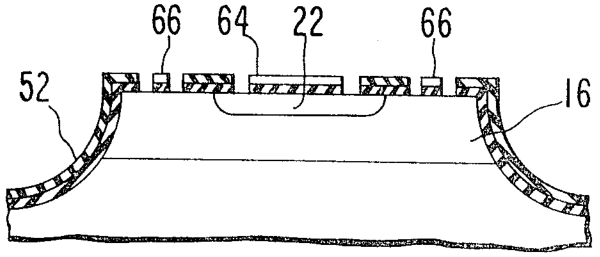

Next, a dielectric lifting material similar to that hereinbefore described is formed over the surface, masked, and selectively removed along with a portion of the thin oxide layers 60 and 62, leaving a two-layer combination 64 and 66 of oxide and liftant located midway in the openings with a portion of the upper surface of active regions 16 and 22 exposed, as shown in FIG. 3B.

Figure 3C:
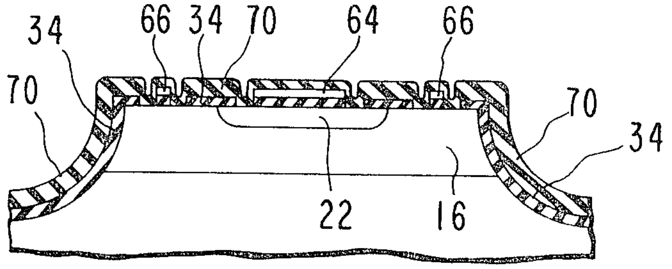
Figure 3D:
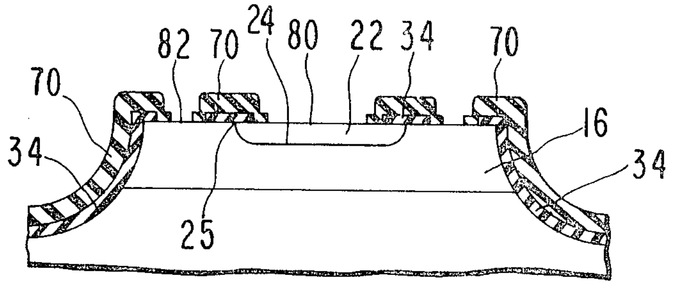

Referring to FIG. 3C, another layer of nitride is formed over the first nitride layer 52 (see FIG. 3B), the exposed portion of the active regions 16 and 22 and the liftant-oxide combination 64 and 66 in such a manner that the nitride located over the liftant combination 64 and 66 cracks, whereas the remaining nitride portions not over liftant 64 and 66 do not crack, as hereinbefore described. Note that a double thick nitride layer 70 is now provided over the oxide 34. Upon application of a suitable etchant, such as a solution of dilute acid to the device surface, the etchant travels through the cracks to reach and dissolve the liftant portion of combinations 64 and 66, taking with it the nitride portion located thereover and the oxide portion located thereunder, and leaving openings 80 and 82 as shown in FIG. 3D. Electrical contact can be made during a subsequent processing step to the active regions 16 and 22.

The thicker nitride layer 70 extends to overlap and seal off the oxide 34 from environmental contamination and mobile ions. Moreover, the protective oxide 34 overlies the surface edge 25 of the emitter-base junction 24 so that the nitride layer 70 does not harm the electrical characteristics of junction 24. Furthermore, thicker nitride layer 70 provides another advantage in that if pinholes had formed during deposition and etching of the first nitride layer 52 (see FIG. 2B), the additional layer of nitride functions to cover the unwanted pinholes and prevent shorts or subsequent contamination.

Figure 4:
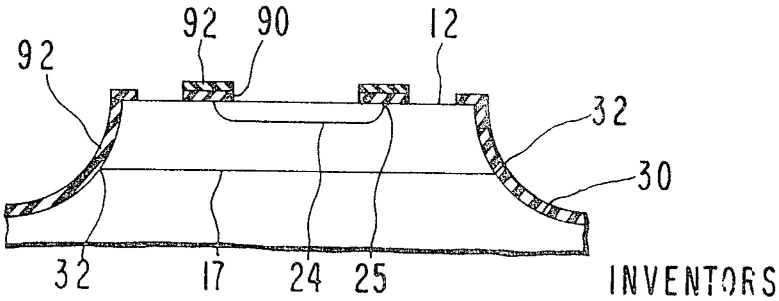
FIG. 4 is a simplified cross-sectional view of an alternative structure wherein an intermediate oxide layer is located over the upper surface edge of the emitter-base PN-junction, but not over the curved surface edge of the collector-base PN-junction.

Referring to FIG. 4, it may be desirable as an alternative embodiment for the oxide layer 90 to be located only over the upper plane portion 12 of the principal surface but not over the curved portion 30, leaving the nitride layer 92 in direct contact with the curved portion 30. Such a structure functions satisfactorily for some applications, because although the emitter-base junction 24 generally operates in the forward-bias direction and its surface edge 25 needs protection from the nitride 92, the collector-base junction 17 by contrast operates in a reverse-bias direction and its electrical characteristics are not substantially affected when the nitride layer is in direct contact with the surface edge 32. Thus, the nitride layer 92 is in direct contact with the curved portion 30 but not the upper plane portion 12, particularly where the surface edge 25 of emitter-base junction 24 appears.

For some applications where increased space-charge recombination in a device can be tolerated, it may be desirable to apply the nitride barrier layer directly to the upper as well as the curved portions of the principal surface. For example, in devices operating at high current densities (such as in milliamperes per square mil compared to microamperes per square mil), the effects of space-charge recombination can be negligible and elimination of the intermediate oxide layer does not affect overall operation. Referring to FIG. 4 without the oxide underlayer 90, the nitride barrier layer 92 would be located directly upon the plane portion 12 of the principal surface, as well as upon the curved portion 30.

It has been found that a prior art mesa-type semiconductor device without the passivating nitride layer located over the curved and upper portions of the principal surface exhibits leakage current on the order of milliamperes or more. By contrast, a mesa-type semiconductor device of the same type but incorporating the passivating nitride layer process and structure of the invention exhibits a reverse-bias leakage current of approximately 1 to 10 nanoamperes. It follows therefore that the method and structure of the invention reduces leakage current by approximately six orders of magnitude when compared to devices of the prior art.

We claim:

1. A method of passivating a semiconductor device whose principal surface has both plane and curved portions, the steps comprising:
   - forming a dielectric insulating lifting material comprising a doped silicon vapox over selected portions of the principal surface;
   - depositing a silicon nitride layer of barrier material impermeable to mobile ions over exposed portions of the lifting material and the principal surface, said depositing being performed at a temperature and in such a manner so that a multiplicity of cracks are formed in portions of the barrier layer located over the lifting material, but not in the remainder of the barrier layer;
   - removing the lifting material using selective solvent therefor, including the barrier layer located thereon.

2. The method as recited in claim 1 further defined by the additional step prior to the step of forming the lifting material of forming a layer of protective, passivating material over selected portions of the exposed principal surface, wherein the passivating layer is interposed between the principal surface and the subsequently formed lifting material and barrier layer.

3. The method as recited in claim 2 wherein the barrier layer has a dense atomic structure and a relatively slow etch rate in certain solutions, whereas the dielectric lifting material has a relatively rapid etch rate in the same solutions.

4. The method as recited in claim 2 wherein the step of forming the dielectric lifting material comprises depositing a layer of the lifting material over the protective layer, and then removing selected portions of the lifting material.

5. The method as recited in claim 4 wherein the dielectric lifting material comprises phosphovapox approximately 1.5 microns thick.

6. The method as recited in claim 4 wherein the dielectric lifting material comprises phosphorus glass approximately 3,000 to 4,000 angstroms thick.

7. The method as recited in claim 1 further defined by an additional step prior to the removing step of heating the device to induce cracks in those portions of the barrier layer overlying the lifting material but not in the remainder of the barrier layer.

* * * * *